(12) United States Patent
Dewan et al.

(10) Patent No.: US 10,837,791 B2
(45) Date of Patent: Nov. 17, 2020

(54) GENERATING AND RECOMMENDING CUSTOMIZED TRAVERSAL ROUTES

(71) Applicant: INTERNATIONAL BUSINESS MACHINES CORPORATION, Armonk, NY (US)

(72) Inventors: Pranita Dewan, Yorktown Heights, NY (US); Mudhakar Srivatsa, White Plains, NY (US); Raghu Kiran Ganti, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 118 days.

(21) Appl. No.: 16/240,353

(22) Filed: Jan. 4, 2019

(65) Prior Publication Data

US 2020/0217680 A1    Jul. 9, 2020

(51) Int. Cl.
*G01C 21/34* (2006.01)

(52) U.S. Cl.
CPC ....... *G01C 21/3484* (2013.01); *G01C 21/343* (2013.01); *G01C 21/3446* (2013.01)

(58) Field of Classification Search
CPC .............. G01C 21/3484; G01C 21/343; G01C 21/3446
See application file for complete search history.

(56) References Cited

U.S. PATENT DOCUMENTS

| | | | |
|---|---|---|---|
| 8,775,070 B1 | 7/2014 | Bhatia | |
| 10,371,537 B1* | 8/2019 | Wilczynski | ........ G01C 21/3415 |
| 2002/0128773 A1 | 9/2002 | Chowanic et al. | |
| 2002/0138196 A1 | 9/2002 | Polidi et al. | |
| 2003/0093217 A1 | 5/2003 | Petzold et al. | |
| 2006/0206258 A1 | 9/2006 | Brooks et al. | |
| 2010/0094534 A1* | 4/2010 | Naick | ................ G01C 21/3484 |
| | | | 701/532 |
| 2014/0278091 A1* | 9/2014 | Horvitz | ................ G06Q 10/047 |
| | | | 701/533 |
| 2016/0320200 A1 | 11/2016 | Delling et al. | |
| 2017/0067749 A1 | 3/2017 | Golding et al. | |
| 2018/0112995 A1* | 4/2018 | Bortolussi | .......... G01C 21/3679 |
| 2019/0056233 A1* | 2/2019 | Liu | ..................... G01C 21/3484 |
| 2020/0182635 A1* | 6/2020 | Zender | ............... G01C 21/3484 |

\* cited by examiner

*Primary Examiner* — Hussein Elchanti
(74) *Attorney, Agent, or Firm* — Griffiths & Seaton PLLC

(57) ABSTRACT

Embodiments for implementing customized traversal routes by at least a portion of a processor in a computing environment. One or more traversal routes may be generated from a route network for a user to traverse according to one or more parameters and user preferences. One or more edge metrics may be assigned to the one or more traversal routes while periodically updating the one or more parameters, the user preferences, or a combination thereof associated with the one or more traversal routes.

20 Claims, 9 Drawing Sheets

GENERATING AND RECOMMENDING CUSTOMIZED TRAVERSAL ROUTES

BACKGROUND OF THE INVENTION

Field of the Invention

The present invention relates in general to computing systems, and more particularly to, various embodiments for generating and recommending customized traversal routes in a computing environment by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, processing devices, with the advent and further miniaturization of integrated circuits, have made it possible to be integrated into a wide variety of devices. As great strides and advances in technologies come to fruition, these technological advances can be then brought to bear in everyday life. For example, the vast amount of available data made possible by computing and networking technologies may then assist in improvements to quality of life and appropriate living conditions.

SUMMARY OF THE INVENTION

Various embodiments for implementing customized traversal routes are provided. In one embodiment, by way of example only, a method for implementing customized traversal routes, again by a processor in an Internet of Things (IoT) computing environment is provided. One or more traversal routes may be generated and recommended from a route network for a user to traverse according to one or more parameters and user preferences, wherein the parameters include a distance parameter, an elevation parameter, a popularity parameter, or a combination thereof.

In an additional embodiment, one or more traversal routes may be generated from a route network for a user to traverse according to one or more parameters and user preferences. One or more edge metrics may be assigned to the one or more traversal routes while periodically updating the one or more parameters, the user preferences, or a combination thereof associated with the one or more traversal routes.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
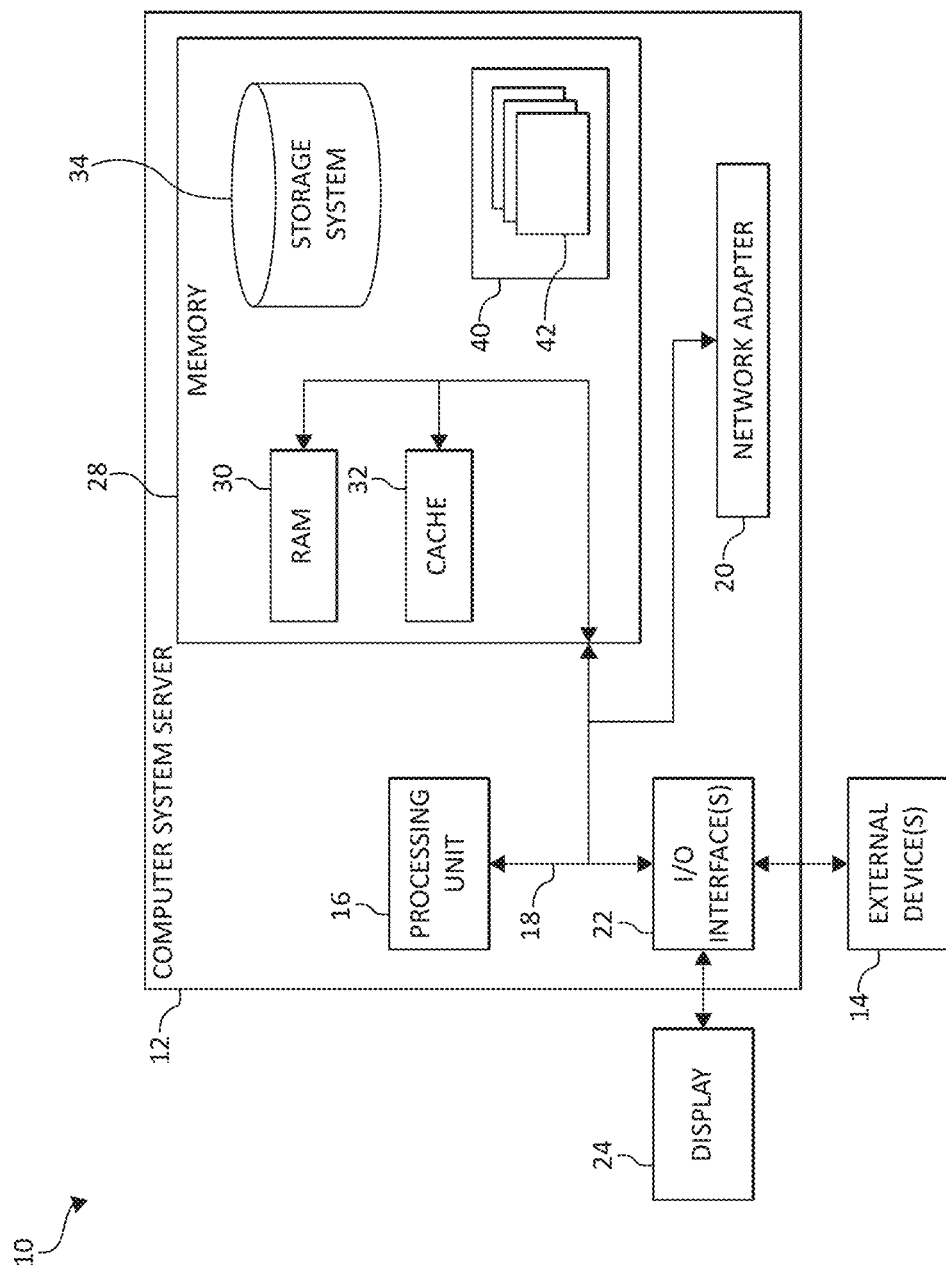
FIG. 1 is a block diagram depicting an exemplary computing node according to an embodiment of the present invention.

As a preliminary matter, computing systems may include large scale computing called "cloud computing," in which resources may interact and/or be accessed via a communication system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

The prolific increase in the use of IoT appliances in computing systems, particularly within the cloud computing environment, in a variety of settings provide various beneficial uses to a user. Various IoT appliances may be used for personal use, such as travel or exercise, while also using the IoT appliances within various types of navigation systems for travel. Such information may be provided to a user for planning various health related activities (e.g., running, hiking, biking, etc.). For example, many exercising/running and tracking applications aim to provide running route recommendations to users. Currently, these recommendations are based on either the runs submitted by existing users of the applications or simply on the basis of a shortest path route between the desired start and end locations or some combinations of both.

However, this approach is unable to handle suggesting completely new custom running routes based on multiple desired metrics. For example, assume a user arrives in a new city for a business meeting and desires to go running around the city and desires to run by famous landmarks, desires to run in heavily populated areas for safety reasons, wishes to run a distance of 5 kilometers, run on inclined roads, and wants the starting location to be the ending location (e.g., a loop). A major challenge experienced by the user is using these various computing devices/IoT appliances to plan a running route based on the multiple, desired metrics and user preferences.

Accordingly, the present invention provides for implementing customized traversal routes. One or more traversal routes may be generated and recommended from a route network for a user to traverse according to one or more parameters and user preferences, wherein the parameters include a distance parameter, an elevation parameter, a popularity parameter, or a combination thereof. Thus, the present invention provides for implementing customized traversal routes by 1) routing based on a desired distance value (as compared to a shortest or minimum cost routing) and multiple metrics, 2) evaluating, processing, and considering static (e.g., elevation), and dynamic (popularity) metrics, and/or 3) generating routes with a same start and end location (e.g., loops).

Thus, the present invention provides for generating new traversal routes (e.g., running, walking, hiking, biking routes etc.) by starting and ending at the same location (e.g., forming a loop) or between two separate locations while taking in to account a user's preferences for making the recommendations. The user preferences may include metrics such as, for example, a selected distance the user intends to traverse/travel (e.g., run, walk, hike, etc.), a desired elevation for the run (e.g., hills, valleys, etc.), whether the user intends/desires to run through certain locations or areas and also the popularity of the entire (or parts) of the running routes, in case these are used by other runners. The present invention performs a multi-metric routing by generating internal way points and then performing a minimum cost path routing between these to generate routes desired by the users so as to generate entirely new running loops and routes, which is not possible with traditional shortest path based. The minimum cost may be a weighted minimum cost taking into account all metrics.

In one aspect, a road/transportation network for the generated routes may be modeled as a graph with one or more destinations or waypoints represented by edges. In one aspect, a waypoint may be an intermediate point or place on a route or line of travel, a stopping point or point at which course is changed. Each edge may be assigned a cost associated with the cost of traversing to that particular edge. The total cost of a path may be the sum of the cost of the selected edges in the path. A determination is made regarding the minimum cost path to use to route a packet across the network.

In one aspect, the present invention may provide an arbitrary definition of "cost" and provides a tradeoff between a direct path from start to end or a longer path that allows for more searching along the route (e.g., a tradeoff between two objectives by performing a deterministic decision at every step/waypoint of the route). The travel cost/benefit is unknown prior to a start of a journey and is learned via the opportunistic search.

Thus, the present invention provides an opportunistic search of low cost/high benefit locations between the start and end of the journey. A minimum cost (and maximum benefit) path may be learned/determined between two defined locations and an arbitrary number of intermediate waypoints. A resulting map of the observed values of the variable(s) that were the object of the opportunistic search may be generated. A route finding operation may be performed in real time with the updated route provided to one or more users.

In one aspect, one or more traversal routes may be generated from a route network for a user to traverse according to one or more parameters and user preferences. One or more edge metrics may be assigned to the one or more traversal routes while periodically updating the one or more parameters, the user preferences, or a combination thereof associated with the one or more traversal routes.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
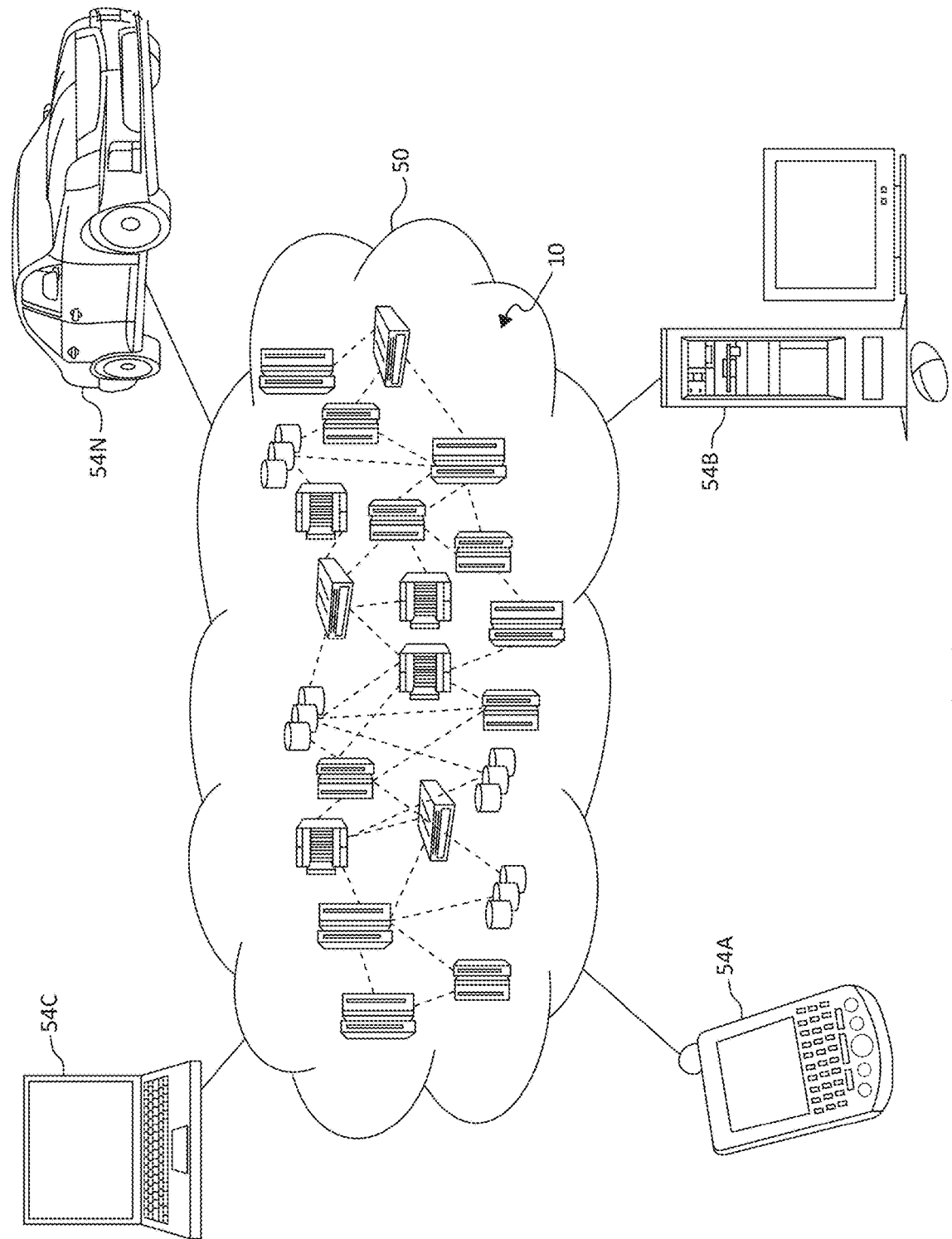
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
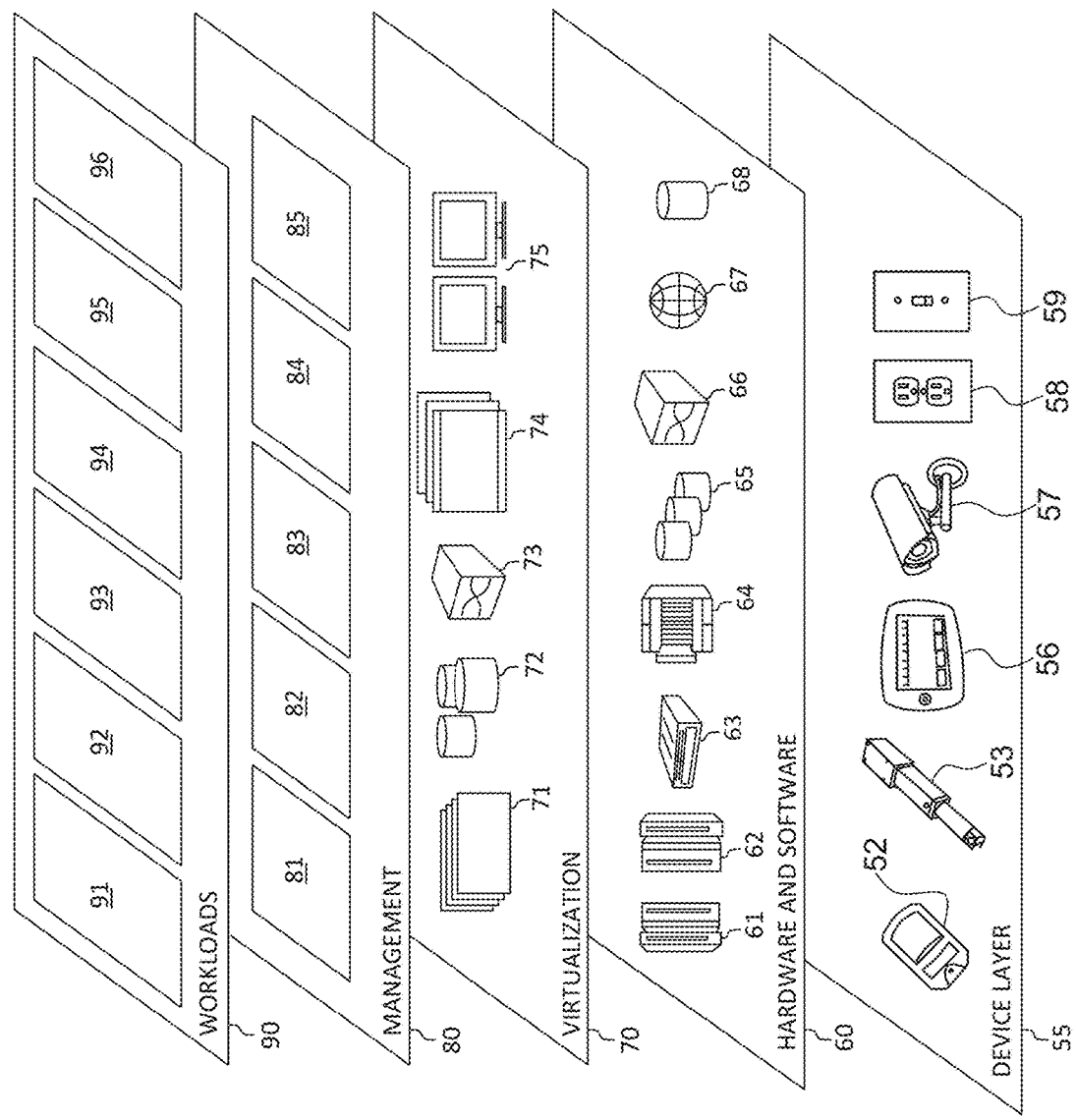
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96. In addition, workloads and functions 96 for implementing customized traversal routes may include such operations as data analytics, data analysis, and as will be further described, notification functionality. One of ordinary skill in the art will appreciate that the workloads and functions 96 for implementing customized traversal routes may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
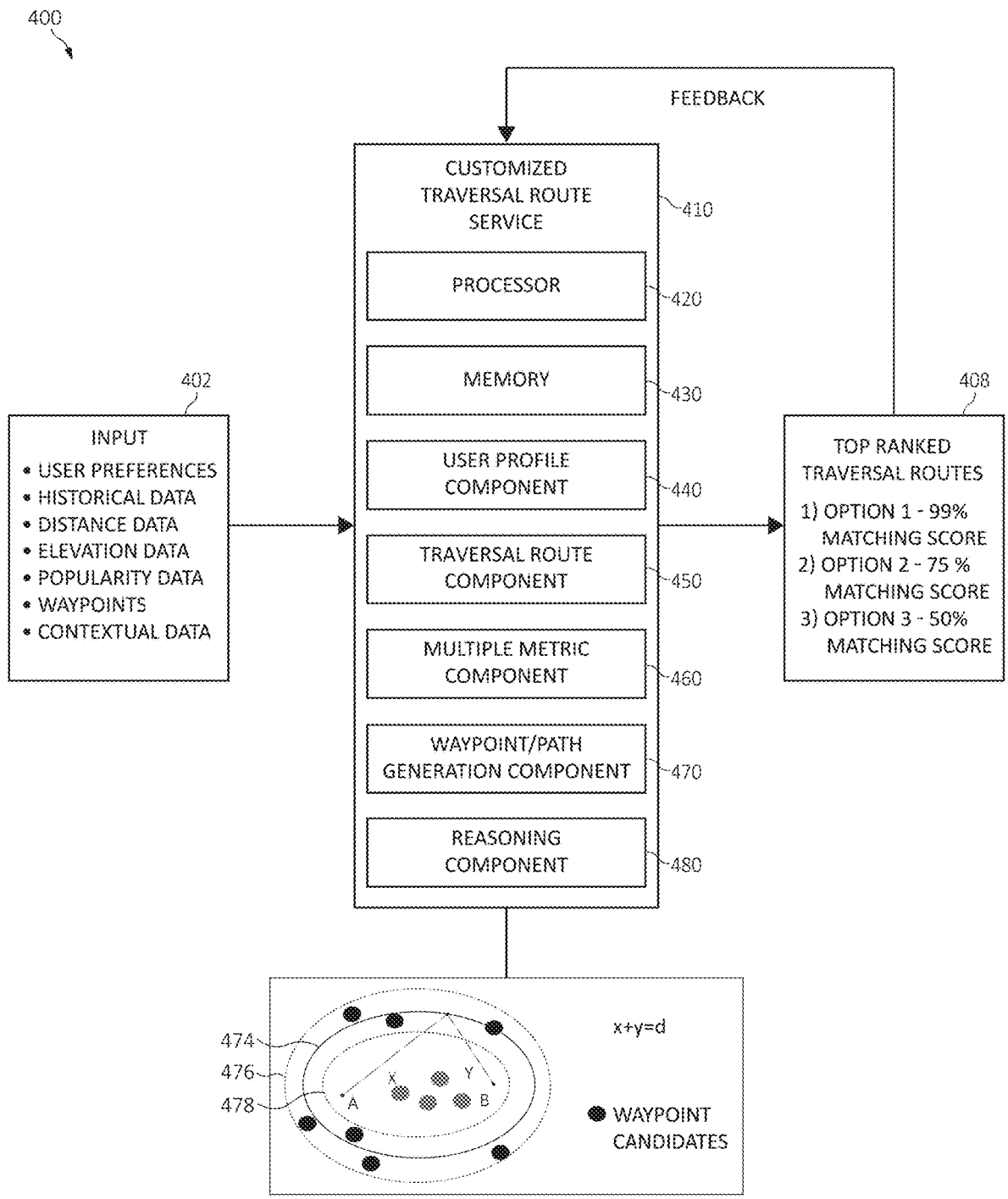
FIG. 4 is an additional block diagram depicting an exemplary functional relationship between various aspects of the present invention.

Turning now to FIG. 4, a block diagram depicting exemplary functional components of a cognitive system 400 according to various mechanisms of the illustrated embodiments, is shown. In one aspect, one or more of the components, modules, services, applications, and/or functions described in FIGS. 1-3 may be used in FIG. 4.

A customized traversal route service 410 is shown, incorporating at least one processing unit 420 ("processor") to perform various computational, data processing and other functionality in accordance with various aspects of the present invention. The processing unit 420 may be in communication with memory 430. A user profile component 440, a traversal route component 450, a multiple metric component 460, a waypoint/path generation component 470 of a knowledge domain, and a reasoning component 480 is shown, each of which may also be in communication with and/or controlled by the processor 420.

In one aspect, the functional components of the cognitive system 400 illustrates a feedback loop with one or more various inputs 402 used by the customized traversal route service 410 to generate an output 408 of recommended and ranked routes for a user to traverse according to one or more parameters and user preferences. For example, the ranked traversal routes may be 1) option 1 with having a 99% matching score, 2) option 2 with having a 75% matching score, and/or 3) option 3 with having a 50% matching score.

Also, the functional components 400 may use a feedback loop for updating data of the customized traversal route service 410 based a user feedback, IoT device feedback, and/or feedback relating to the recommended and ranked routes for a user to traverse according to one or more parameters (e.g., distance data, elevation data, popularity data, user preferences, and/or a user profile of the one or more users.

As one of ordinary skill in the art will appreciate, the depiction of the various functional units in customized traversal route service 410 is for purposes of illustration, as the functional units may be located within the customized traversal route service 410 or elsewhere within and/or between distributed computing components.

The user profile component 440, the traversal route component 450, and the multiple metric component 460, the waypoint/path generation component 470, and the reasoning component 480 may each work in concert with processing unit 420 and memory 430 to accomplish various aspects of the present invention.

In one aspect, the customized traversal route service 410 may provide one or more suggestions of ranked traversal routes while taking into account various inputs 402 such as, for example, one or more user preferences, historical data, distance data, elevation data, popularity data, one or more waypoints, traffic data, travel plans, or a combination thereof. As previously stated, the customized traversal route service 410 may operate in a closed loop environment by receiving one or more inputs 402 into the customized traversal route service 410 and providing one or more outputs 408 for customize traversal route generation. In one aspect, the customized traversal route service 410 may operate in a cloud environment.

For example, one or more inputs 402 such as, for example, user data, mapping information, multiple metrics/parameters data, weather data, environmental factors, traffic parameters/data, user profiles, route profiles, waypoints, contextual data, historical data (e.g., other users that run/walk, etc.), and the like, may be integrated together using the customized traversal route service 410 to map, generate and/or recommend one or more traversal routes from a route network for a user to traverse according to one or more parameters and user preferences. The inputs 402 may also include one or more coordinates of a starting location, coordinates of a location of the primary objective, coordinates of the one or more waypoints.

The user profile component 440 may be used to collect, store, and/or retrieve data relating to a user such as, for example, a defined starting location, a defined ending location, a preferred start time, an earliest possible start time (based on a user's schedule or preference), a preferred end time, a latest possible end time (based on a user's schedule or preference), mode of route traversal preference (e.g., walking, biking, running, and the like), waypoints, calendar information, preferences and interests, a physical or emotional condition of the user, travel experience of the user, weather data, and defined preferences indicating an amount or desire for the exposure to light.

The output 408 may be a customized and dynamic mapping that suggests one or more routes, paths, streets, railways, walkways, or a combination thereof that considers both 1) the opportunistic search of an unknown domain to achieve secondary objectives while both progressing towards the primary objective, and 2) the travel costs and the knowledge of the vehicle relative to one or more waypoints.

The user profile component 440, the traversal route component 450, and the multiple metric component 460 may each undergo various data analytics functions associated with the customized traversal route service 410. As one of ordinary skill in the art will appreciate, the user profile component 440, the traversal route component 450, and the multiple metric component 460 may implement mathematical modeling, probability and statistical analysis or modeling, machine reasoning, probabilistic logic, text data compression, or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

In one aspect, the reasoning component 480 may be used to cognitively reason and interact with a user. The reasoning may include employing an artificial intelligence system to "reason" with the user. The reasoning may include justifying (e.g., providing support/evidence in a language format such as, for example, audible or written communication) to the user the "reason" or support for each suggestion. The reasoning may include learning one or more coordinates, one or more waypoints, one or more primary and secondary objectives, and/or personal preferences.

Using the various input data and/or collected reasoning data, the traversal route component 450 may generate and recommend one or more traversal routes from a route network for a user to traverse according to one or more parameters and user preferences, wherein the parameters include a distance parameter, an elevation parameter, a popularity parameter, or a combination thereof. The multiple metric component 460, in association with the traversal route component 450, may define the distance parameter as a distance a user intends to traverse or a distance required to traverse on the one or more traversal routes, the elevation parameter as one or more elevations the user intends to ascend or descend for traversing the one or more traversal routes, the popularity parameter as a number of alternative users using the one or more traversal routes equal to or greater than a threshold.

The traversal route component 450, in association with the waypoint/path generation component 470, may determine a starting location, a finishing location, and one or more waypoints in the route network according to the one or more parameters and user preferences, wherein the starting location and a finishing location are defined as two separate locations or defined as the same location.

More specifically, the waypoint/path generation component 470 determine one or more waypoints and a minimum cost path between each of the one or more waypoints in the route network according to the one or more parameters and user preferences.

In one aspect, the waypoint/path generation component 470 may generate the waypoints using ellipse 475 with inner ellipse polylines 478 and outer ellipse polylines 476 of the ellipse 475 illustrated with line 474. For example, if there are two fixed points on a plane, the distance of a point of a set of all points from these two fixed points may add up to a fixed constant d, forms an ellipse. The two fixed points may be the ellipse foci. An ellipse may also be defined analytically as the set of points for each of which the sum of its distances to two foci is a fixed number. For the present invention, what this means is that an ellipse may be defined with the two foci being a desired start and end locations/points and the fixed number being the required distance, which is referred to herein as "d." To generate the waypoints between point A and point B such that required distance equal "d" (e.g., distance=d), an ellipse with point A and point B may be defined as the foci. The outer ellipse polylines 476 and the inner polylines 478 may be generated based on a distance threshold. One or more road network points lying between the inner ellipse polylines 478 and outer ellipse polylines 476 may be waypoint candidates, while other way-points not satisfying user requirements may be eliminated.

The traversal route component 450, in association with the waypoint/path generation component 470, may 1) determine a first minimum cost path between a selected waypoint and a starting location according to the one or more parameters and user preferences, 2) determine a second minimum cost path between the selected waypoint and a finishing location according to the one or more parameters and user preferences, and/or 3) generate a traversal route by joining the first minimum cost path and the second minimum cost path.

The traversal route component 450, in association with the waypoint/path generation component 470, may generate one or more sub-traversal routes between one or more waypoints according to the one or more parameters and user preferences, and/or create the one or more traversal routes by combining each of the one or more sub traversal routes. The traversal route component 450 may rank the one or more traversal routes having one or more way points according a level of similarity to the one or more parameters and user preferences.

In one aspect, the waypoint/path generation component 470 may recommend routes between point A and point B with distance ("d") and other desired metrics (e.g., m1, m2, . . . , mn). M waypoints may be determined/generated heuristically as follows. 1) N way-points may be obtained by creating inner ellipse polylines 474 of an ellipse 475 based on a required distance between point A and point B and selecting a road network graph points lying between the inner ellipse polylines 474 and outer ellipse polylines 476 of ellipse 475. M waypoints ("MwP") (e.g., points belonging to the road network graph) may be sub-selected from the N points based on user preferences (to eliminate points that do not satisfy user's desirability criteria (e.g., elevation is too high). To get p paths between point A and point B, for every p∈MwP (e.g., each "p" point of a set of "M" waypoints), calculate/determine a minimum cost path between point A and p waypoint and p waypoint and B. That is, for each point in the set of way points, the present invention may perform the action of calculating minimum cost paths between A (start) and way point and way point and B (end). The two paths may be combined to get the full/larger path. The edge cost for an edge "i" with distance di and metrics (m1i, . . . , mni) may be defined as:

$$Wd*di + Wm1*m1i + \ldots + Wmn*mni(\text{inverse}(Wi*1/mi)) \quad (1),$$

which may be is used for metrics to be maximized such as, for example, popularity. That is, for a given edge "i," in the road network, m1i, m2i, . . . , mni are the user desired preference metrics (such as elevation, popularity, etc.) and the W values are the weight or levels of importance assigned to each of them. It should be noted that inverse of the weight*metric may be used for the metrics that are desired to maximize instead of minimize such as, for example, popularity). To minimize overlapping edges in a route, costs of edges already present in the route may be dynamically increased. The in paths may be ranked such as, for example, by increasing RMSE between required metrics and the cumulative metrics for the path and recommend top-k to the user.

It should be noted that the traversal route component 450 may internally include and/or externally access a knowledge domain, data and meta-data repository of routes, roads, streets, highways, interstates, bridges, airports, train stations, bus stations, airplanes, airports, subways, parking facilities, architectural designs, weather maps, weather and season patterns, maps, a variety of infrastructures relating to travel having information relating to both size, length, a degree of complexity or design of the infrastructure, visibility, problems or issues relating to road work or repair, traffic congestion patterns and data, travel services, travel related retail or commercial businesses, various online data sources, social media network/social media accounts, types and descriptions of various means or modes of transportation, user/driver profiles, environmental factors and conditions, and any other types of data or information relating to combining journey planning and traversal route generation services.

In one aspect, a thesaurus or ontology as the knowledge domain may be used for the traversal route component 450 with the information and concepts relating to routes, roads, streets, highways, interstates, bridges, maps, and/or a variety of infrastructures relating to journey planning and opportunistic searching, user preferences (e.g., a starting location, an ending location, an earliest starting time, a latest arrival time, etc.), building data, route data (e.g., size, length, a degree of complexity or difficulty of a route), visibility, problems or issues relating to road work or repair, and/or traffic congestion. In one aspect, the waypoint/path generation component 470 may be in association with one or more various applications, which may continuously provide updated information for the ontology. The thesaurus and ontology may also be used to assist with the customized traversal route service 410.

In one aspect, the term "domain" is a term intended to have its ordinary meaning. In addition, the term "domain" can include an area of expertise for a system or a collection of material, information, content and/or other resources related to a particular subject or subjects. For example, a domain can refer to information and concepts relating to a network (e.g., travel network, neighborhood, geographical area, etc.) and/or a selected region (e.g., a city or town or a defined section of a city/town), routes, roads, streets, highways, interstates, bridges, maps, trails, run/bike/hike paths, and/or a variety of infrastructures relating to traversing a route A domain can refer to information related to any particular subject matter or a combination of selected subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class, concept and/or property.

Content can be any searchable information such as, for example, information distributed over a computer-accessible network, such as the Internet. A concept can generally be classified into any of a number of concepts which may also include one or more sub-concepts, all potentially connected with other concepts via properties defined in the ontology. Examples of concepts may include, but are not limited to, information and concepts relating to user preferences, opportunistic searching, routes, roads, streets, highways, interstates, bridges, maps, travel costs, and/or a variety of infrastructures relating to customized traversal route generation having information relating to both multiple metrics/parameters, user preferences, transportation networks, vehicles, building data, route data (e.g., size, length, a degree of complexity or difficulty of a route), visibility, problems or issues relating to road work or repair, and/or traffic congestion, information about individual people, cultures, groups, sociological groups, market interest groups, institutions, universities, governments, teams, travel services, travel costs, or any other travel related services or industries. The ontology can be continuously updated with the information synchronized with the sources, adding information from the sources to the ontology as models, attributes of models, or associations between models within the ontology.

In one aspect, the various functional units in customized traversal route service 410 analysis may apply to one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

In view of the foregoing of FIGS. 1-4, consider the following operations. A user provides as input 1) a desired start and end locations, 2) desired run distance, 3) required shortest distance ("SD"), and optionally 4) any other desired metrics (e.g., elevation, popularity, via locations, etc.).

Step 1), if the user has not provided any locations: 1) a shortest path distance may be obtained between desired start and end locations, and the shortest SD for traversing a path (e.g., running). The shortest SD will be zero in case the start and end is the same location.

Step 2), if the Required SD is greater than the Shortest SD, a "K" number of ranked routes may be ranked, where "K" is the number of ranked routes that will be recommended to the application user). One or more waypoints may be determined as follows. A) Slack may be determined (e.g., Required SD-Shortest SD). B) If Slack is equal to the Required SD (e.g., the start and end locations are the same), k way points may be determined by obtaining k randomly selected azimuth values and for each of these, and destination points at a distance of slack divided by "slack/2" from start location, where "k" is a positive integer or selected value. These destination points may act as the k way points; otherwise if a number of points on the shortest path ("NumPtsS") is k, pick k points on the shortest path and from each of these, k destination points at distance of Slack/2 and randomly selected azimuth values to get k way points may be computed. Otherwise, if else, get NumPtsS destination points from the points on the shortest path and the remaining (k-NumPtsS) from the approximate midpoint of the shortest path, to get a total of k way points.

Step 3), get k paths as follows: for each of the k way points, compute a minimum cost path from start to way point and from way point to end and then combine these two routes to get the complete route. The minimum route path computation takes in to account all the desired metrics by assigning a weighted cost to each edge of the road network, instead of just the distance (which is typical in shortest path routing).

Step 4), For each of the k routes, compute a cumulative value for every metric by adding the metric's value for each edge of the route.

Step 5) a set of top-k routes may be recommended to the user. Ranking of the routes is performed by increasing route RMSE (Root Mean Square Error) values. RMSE for each route is computed by identifying, determining, and/or used the difference between the desired metrics and the cumulative route metrics.

If user has provided via locations: The above operations may be performed with one or more changes as follows. As in step (1), instead of computing the single shortest path distance between start and end, a list of shortest path distances may be computed through the provided via locations. For example, if location "L" 1, 2, and/or 3 ({L1, L2, L3}) are via locations provided by the user, then 4 shortest path distances will be computed, {Shortest L1, Shortest L1L2, Shortest L2L3, Shortest L3D}, such as, for example, start to L1, L1 to L2, L2 to L3 and L3 to end. The Slack may be calculated and the slack may be divided among the number of shortest paths in the ratio of the path lengths. In additional aspect, if the user provides a via path rather than a via point, no slack is distributed to this path, since the user wants to run on the path (say along the river), hence this shortest path is retained as is. Once, the calculated routes for all the sub-paths are determined, these are then merged together to form a single path. The ranking may be performed through a recursive process of looking at all sub-path combinations and then picking the top-k to be returned to the user.

Figure 5:
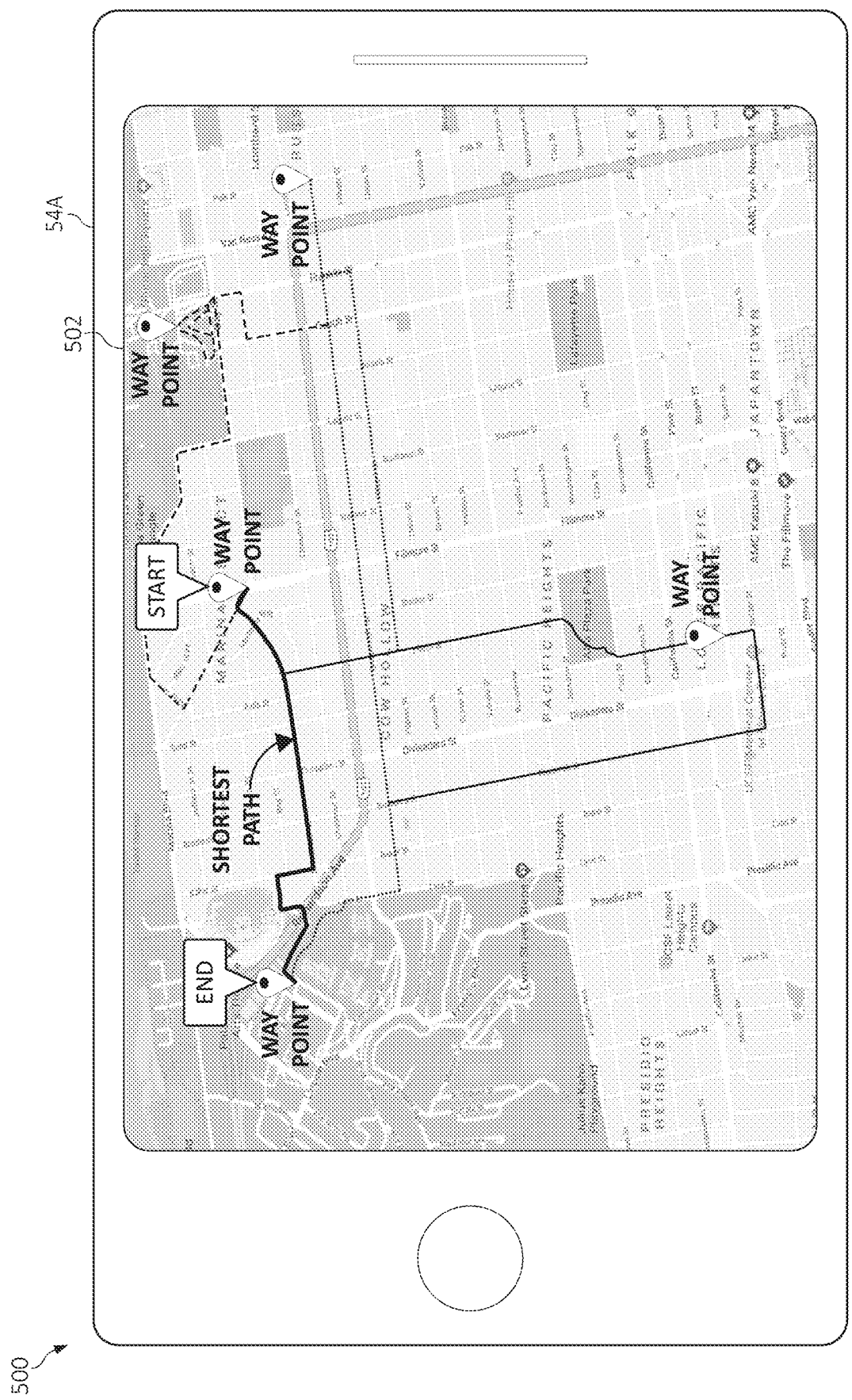
FIG. 5 is an additional block diagram depicting recommended customized traversal routes by a processor, again in which aspects of the present invention may be realized.

Turning now to FIG. 5, a block diagram of exemplary functionality of a customized traversal route service system 500 is depicted. In one aspect, a computing device such as, for example, personal digital assistant (PDA) or cellular telephone 54A of FIG. 2 may incorporate computer system 12, which may display map 502 (e.g., a customized traversal route map 502). It should be noted that the personal digital assistant (PDA) or cellular telephone 54A of FIG. 2 is illustrated in FIG. 5 by way of example only and any computing device may be used such as, for example, desktop computer 54B, laptop computer 54C, and/or automobile computer system 54N of FIG. 2. More specifically, map 502 may be divided into selected areas such as, for example, areas 502A and 502B, which may be selected areas highlighted on map 502 and a "line" may be depicted illustrating the area.

On the map 502, a particular area, such as shortest paths and waypoints, with multiple paths connecting to each other, is indicated. In some embodiments, areas of map 502 correspond to a previously defined (or established or mandated) map.

In an additional aspect, it should be noted that if a user desires to run through certain locations or certain routes, the following operation may be performed. For example, assume a user intends/desires to run from point A to point B with distance equal to "d" and other desired metrics such as, for example, m1, m2, . . . , mn and wants to run through landmark "Lx" and on the edge "Lyz" (e.g., landmark Lx on the edge of Lyz (e.g., {Lx, Lyz}). The operations described in FIG. 4 may be used for generating waypoints (e.g., using the ellipse 475) for point A to Lx and Lz to point B (e.g., Lx and Lz being a waypoints), with a total distance divided among the two sub-path computations (e.g., sub-path point A to Lx and sub-path Lz to point B). A single path (e.g., a shortest) path from Y to Z may be obtained since the running on this edge is desired. It should be noted that X and Y the same variable in the x and y of Lyz. L is used for denoting, for example, a landmark. Lx is stating landmark at point/location x and Lyz specifying landmark as the edge from points y to z. Recursively, all sub-path combinations may be obtained to get the complete/full paths from point A to point B. All of the complete/full paths may be ranked.

Figure 6:
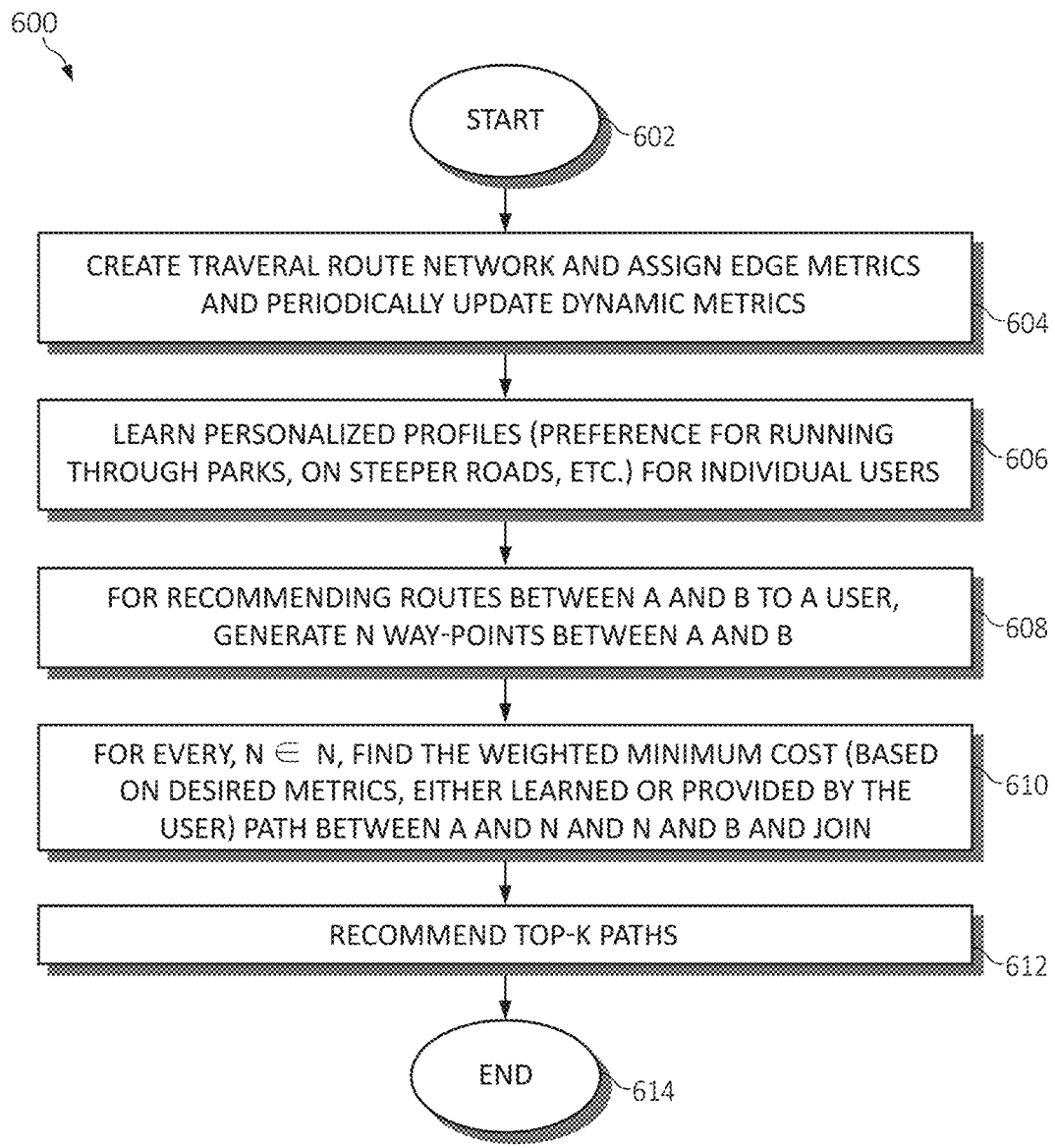
FIG. 6 is a flowchart diagram depicting an exemplary method for generating and recommending customized traversal routes in a computing environment by a processor, again in which aspects of the present invention may be realized.

Turning now to FIG. 6, a method 600 for generating and recommending customized traversal routes in a computing environment by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

A traversal route network may be created, edge metrics may be assigned, and dynamic metrics may be periodically updated, as in block 604. That is, a running network (e.g., a city wide running network) may be created using a mapping application (e.g., open street map "OSM") operation and existing run data (e.g., "historical run data") and assign edge metrics; periodically update dynamic metrics (e.g., popularity metrics). That is, user profiles may be created from historical data. Existing run data is referring to the historical running data from the user or from other users using any such service. Also, edge metrics is referring to fixed metrics of an edge such as, for example, distance, elevation, etc. Dynamic metrics are the metrics that can change over time such as, for example, the popularity (e.g., "on an average, how many people run on this edge?").

One or more user profiles (e.g., personalized profiles) may be learned for each individual user, as in block 606. For example, one or more user preferences may include, for example, a preference for running through various geographical regions/types of terrain (e.g., cities, neighborhoods, forests, hills/mountains, valleys, ocean/beach areas, tropical areas, desert areas, etc.), landmarks, environments (e.g., sun, rain, snow, etc.), parks, sidewalks, running/biking/hiking paths, pave or dirt streets/roads, flat surfaces/roads/trails, steeper surfaces/roads/trails, a combination of various elevations, distances, or other types of interests commonly selected for traversing a surfaces/roads/trails (e.g., running, walking, hiking, etc.) for individual runners using existing run data.

One or more N waypoints between point A and point B may be generated for recommending one or more traversal routes between A and B to a user, as in block 608. For every, n E N (e.g., each "n" waypoint of a set of "N" waypoints), a weighted minimum cost path between point A and n and n and point B may be identified based on one or more parameters (e.g., desired metrics either learnt or provided by the user) and the weighted minimum cost path between point A and n and n and point B may be joined, as in block 608. One or more traversal paths (e.g., a top-k number of paths, where k is a positive integer) may be recommended, as in block 612. The functionality 600 may end, as in block 614.

Figure 7A:
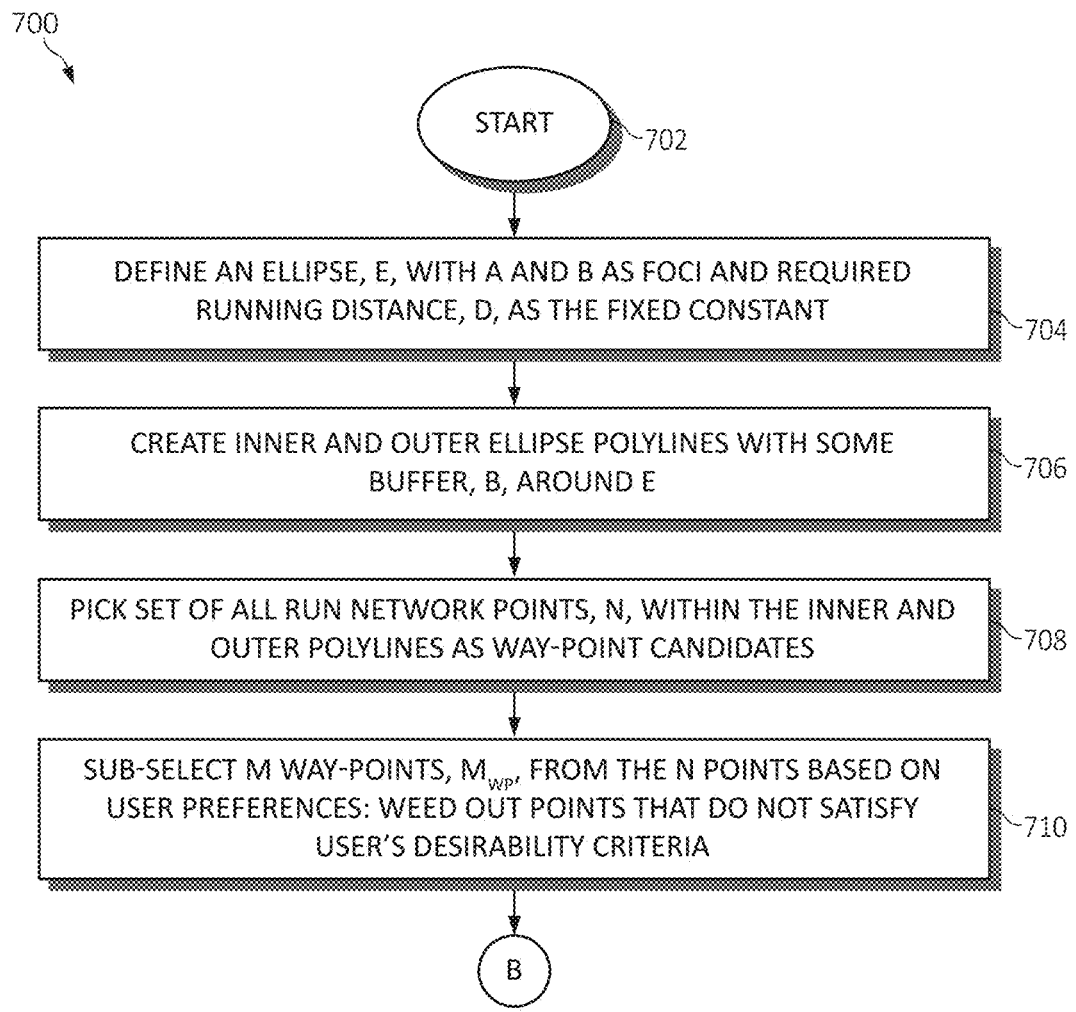
FIGS. 7A-7B are flowchart diagrams depicting an exemplary method for generating waypoints in a computing environment by a processor, again in which aspects of the present invention may be realized.
Figure 7B:
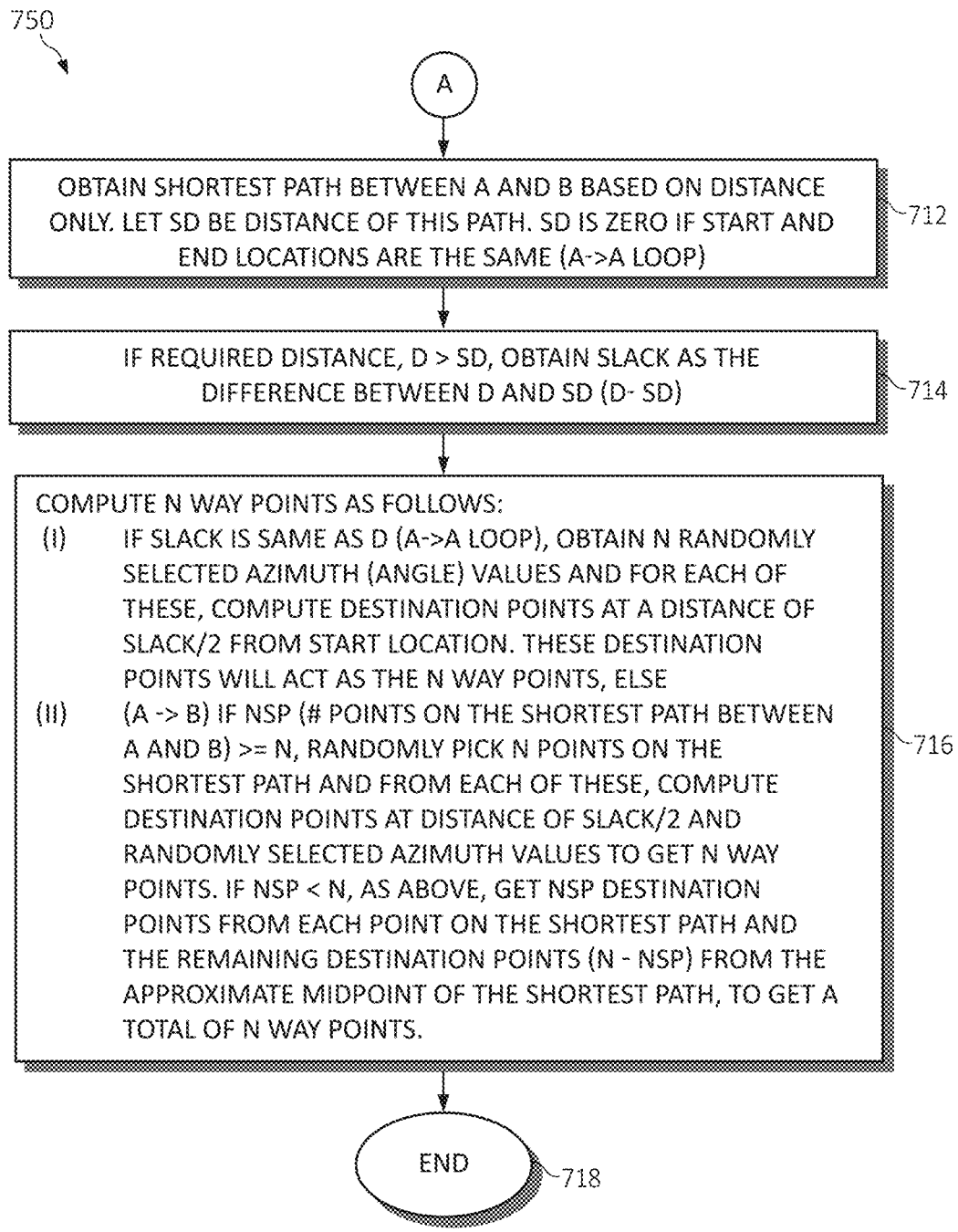

Turning now to FIGS. 7A-7B, methods 700 and 750 for generating and recommending customized traversal routes in a computing environment by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. In one aspect, the method 700 illustrates generating waypoints between at least two points (e.g., point A and point B), which may be identified, learned, and/or selected).

The functionality 700 may start in block 702. An ellipse ("E") may be defined with point A and point B as foci and a required distance ("d") such as, for example, a running distance or biking distance, defined as a fixed constant, as in

704. Inner and outer ellipse polylines may be created with a buffer ("b") around E, as in block 706. A set of all network points ("N") such as, for example, running or biking network points "N" in a traversal network map may be selected within the inner and outer polylines as waypoint candidates, as in block 708. M way-points ("MwP") may be selected (e.g., sub selected) from the N network points (e.g., running network points N or biking network points N) based on user preferences (e.g., eliminate out N running network points that do not satisfy user's desirability criteria/user preferences), as in block 716. That is, "N" are all network points (e.g., road network points) between ellipses. M is the number of points left from the original N after eliminating points not satisfying user criteria as is mentioned here also.

Turning now to FIG. 7B, the method 750 illustrates generating waypoints between at least two similar points (e.g., a loop created from point A and point A or point A to point B), which may be identified, learned, and/or selected). It should be noted that a loop is created only when there is a start point and a distance specified but no end point is specified. A shortest distance (e.g., minimum cost path) may be obtained/determined between point A and point B based only on distance. ("SD" may be defined as the distance of this path) (e.g., the shortest distance between point A and point B). Also, SD may have a value of zero if the starting point and ending/finish locations are the same (e.g., "point A to point" where point A and back to point A forms a loop). SD is the distance of the shortest distance path between A and B.

A slack (e.g., a slack value) may be obtained as a difference between a required distance ("d") the shortest distance ("SD") (e.g., d-SD) if the required distance ("d") is greater than the shortest distance ("SD") (e.g., d>SD), as in block 712.

In block 714, one or more waypoints (e.g., N waypoints) may be determined. More specifically, the N waypoints may be determined by the following operations. For example, in operation (i) If the slack is same as d (e.g., the point A to point A loop), one or more randomly selected azimuth (angle) values may be obtained and for each of these (e.g., each of the previous azimuth points). Destination points may be determined at a distance of the slack divided by a value of two (e.g., slack/2) from start location. That is, N road network points on the shortest path from A to B initially selected (e.g., temporary road network points). From each of these N points, a destination point may be selected/determine (which is obtained by selecting a point at a randomly chosen angle (azimuth) and a distance (e.g., slack/2) from a current point. In this way, N destination points acting as the way points may be obtained from the N temporary points.

These destination points will act as the N way points. In operation (ii), for point A to point B location, if the NSP (e.g., a number of network points on the shortest path between A and B) is greater than or equal to N waypoints, N waypoints may be randomly selected on the shortest path and from each of the N points on the shortest path. Destination points may be determined at a distance of the slack divided by a value of two (e.g., slack/2) and by determining randomly selected azimuth values to obtain N way points. If the NSP is less than the N waypoint as above, NSP destination points may be obtained from each point on the shortest path and the remaining destination points (e.g., N-NSP) may be obtained from an approximate midpoint of the shortest path so as to obtain a total of N waypoints.

Figure 8:
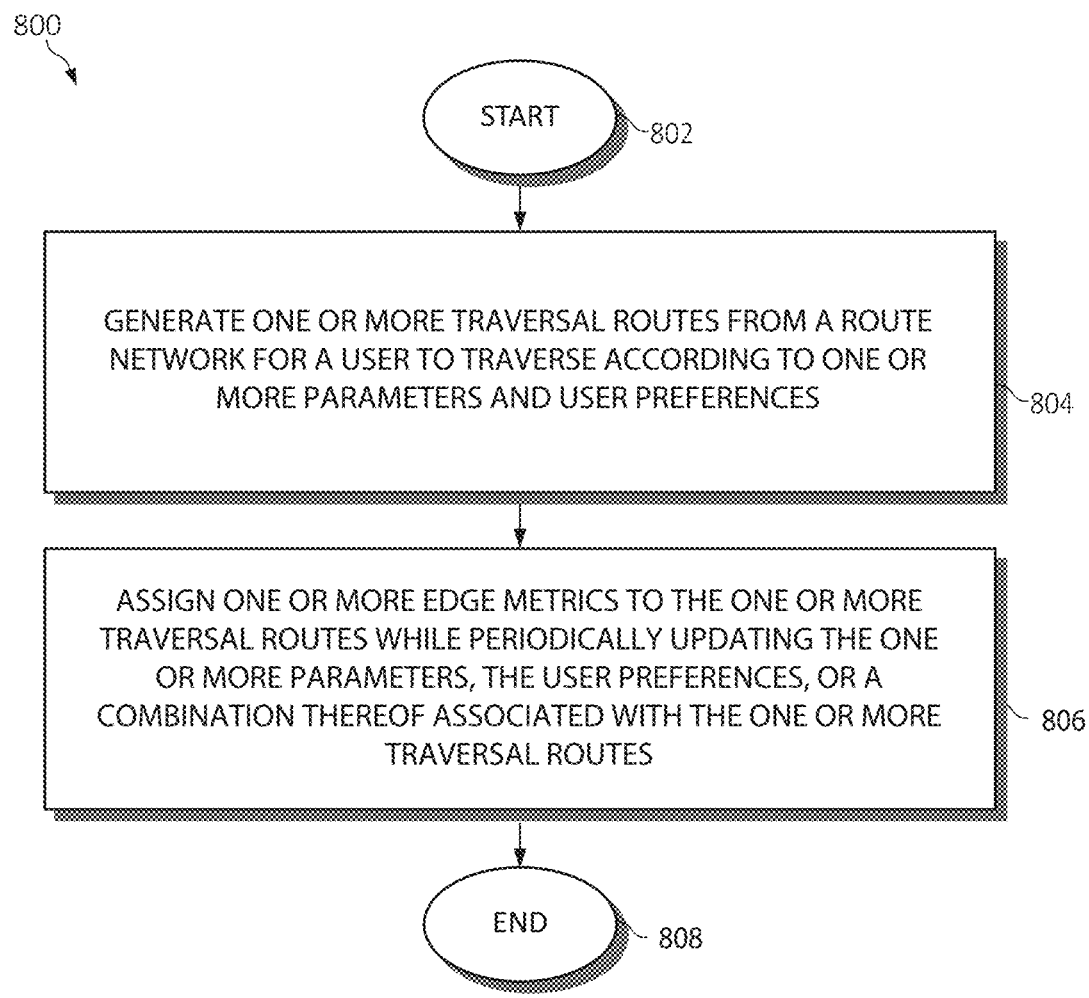
FIG. 8 is a flowchart diagram depicting an exemplary method for generating and recommending customized traversal routes in a computing environment by a processor, again in which aspects of the present invention may be realized.

Turning now to FIG. 8, a method 800 for generating and recommending customized traversal routes in a computing environment by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

One or more traversal routes may be generated from a route network for a user to traverse according to one or more parameters and user preferences, as in block 804. The parameters include a distance parameter, an elevation parameter, a popularity parameter, or a combination thereof. The parameters may also be static One or more edge metrics may be assigned to the one or more traversal routes while periodically updating the one or more parameters, the user preferences, or a combination thereof associated with the one or more traversal routes, as in block 806. The functionality 800 may end, as in block 808.

In one aspect, in conjunction with and/or as part of at least one block of FIG. 8, the operations of method 800 may include each of the following. The operations of method 800 may define the distance parameter as a distance a user intends to traverse or a distance required to traverse on the one or more traversal routes, the elevation parameter as one or more elevations the user intends to ascend or descend for traversing the one or more traversal routes, the popularity parameter as a number of alternative users using the one or more traversal routes equal to or greater than a threshold.

The operations of method 800 may determine a starting location, a finishing location, and one or more waypoints in the route network according to the one or more parameters and user preferences, wherein the starting location and a finishing location are defined as two separate locations or defined as the same location, and/or determine one or more waypoints and a minimum cost path between each of the one or more waypoints in the route network according to the one or more parameters and user preferences.

The operations of method 800 may determine a first minimum cost path between a selected waypoint and a starting location according to the one or more parameters and user preferences, determine a second minimum cost path between the selected waypoint and a finishing location according to the one or more parameters and user preferences, and/or generate a traversal route by joining the first minimum cost path and the second minimum cost path.

In an additional aspect, the operations of method 800 may generate one or more sub traversal routes between one or more waypoints according to the one or more parameters and user preferences and create the one or more traversal routes by combining each of the one or more sub traversal routes. The one or more traversal routes (e.g., a set of traversal routes) having one or more way points may be ranked according a level of similarity to the one or more parameters and user preferences.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing customized traversal routes in a computing environment by a processor, comprising:
receiving input of one or more parameters and user preferences;
generating one or more traversal routes from a route network for a user to traverse according to one or more parameters and user preferences;
assigning one or more edge metrics to the one or more traversal routes while periodically updating the one or more parameters, the user preferences, or a combination thereof associated with the one or more traversal routes, wherein the assigned edge metrics are used to recursively compute sub-combinations of sub-paths for each of the one or more traversal routes based on the one or more parameters and the user preferences; and
responsive to recursively computing each sub-path combination, generating and displaying a weighted list of the sub-paths merged together into the one or more traversal routes on a user device display.

2. The method of claim 1, further including defining the one or more parameters to include a distance parameter that is a distance the user intends to traverse or a distance required to traverse on the one or more traversal routes, an elevation parameter as one or more elevations the user intends to ascend or descend for traversing the one or more traversal routes, a popularity parameter as a number of alternative users using the one or more traversal routes equal to or greater than a threshold, wherein the one or more parameters are static, dynamic parameters, or a combination thereof.

3. The method of claim 1, further including determining a starting location, a finishing location, and one or more waypoints in the route network according to the one or more parameters and the user preferences, wherein the starting location and the finishing location are defined as two separate locations or defined as the same location.

4. The method of claim 1, further including determining one or more waypoints and a minimum cost path between each of the one or more waypoints in the route network according to the one or more parameters and the user preferences.

5. The method of claim 1, further including:
determining a first minimum cost path between a selected waypoint and a starting location according to the one or more parameters and the user preferences;
determining a second minimum cost path between the selected waypoint and a finishing location according to the one or more parameters and the user preferences; and
generating a traversal route by joining the first minimum cost path and the second minimum cost path.

6. The method of claim 1, further including:
generating one or more sub traversal routes between one or more waypoints according to the one or more parameters and the user preferences; and
creating the one or more traversal routes by combining each of the one or more sub traversal routes.

7. The method of claim 1, further including ranking the one or more traversal routes having one or more waypoints according a level of similarity to the one or more parameters and the user preferences.

8. A system for implementing customized traversal routes in a computing environment, comprising:
one or more computers with executable instructions that when executed cause the system to:
receive input of one or more parameters and user preferences;
generate one or more traversal routes from a route network for a user to traverse according to one or more parameters and user preferences;
assign one or more edge metrics to the one or more traversal routes while periodically updating the one or more parameters, the user preferences, or a combination thereof associated with the one or more traversal routes, wherein the assigned edge metrics are used to recursively compute sub-combinations of sub-paths for each of the one or more traversal routes based on the one or more parameters and the user preferences; and
responsive to recursively computing each sub-path combination, generate and display a weighted list of the sub-paths merged together into the one or more traversal routes on a user device display.

9. The system of claim 8, wherein the executable instructions further define the one or more parameters to include a distance parameter that is a distance the user intends to traverse or a distance required to traverse on the one or more traversal routes, an elevation parameter as one or more elevations the user intends to ascend or descend for traversing the one or more traversal routes, a popularity parameter as a number of alternative users using the one or more traversal routes equal to or greater than a threshold, wherein the one or more parameters are static, dynamic parameters, or a combination thereof.

10. The system of claim 8, wherein the executable instructions further determine a starting location, a finishing location, and one or more waypoints in the route network according to the one or more parameters and the user preferences, wherein the starting location and the finishing location are defined as two separate locations or defined as the same location.

11. The system of claim 8, wherein the executable instructions further determine one or more waypoints and a minimum cost path between each of the one or more waypoints in the route network according to the one or more parameters and user preferences.

12. The system of claim 8, wherein the executable instructions further:
determine a first minimum cost path between a selected waypoint and a starting location according to the one or more parameters and user preferences;
determine a second minimum cost path between the selected waypoint and a finishing location according to the one or more parameters and user preferences; and
generate a traversal route by joining the first minimum cost path and the second minimum cost path.

13. The system of claim 8, wherein the executable instructions further:
generate one or more sub traversal routes between one or more waypoints according to the one or more parameters and user preferences; and
create the one or more traversal routes by combining each of the one or more sub traversal routes.

14. The system of claim 8, wherein the executable instructions further rank the one or more traversal routes having one or more way points according a level of similarity to the one or more parameters and user preferences.

15. A computer program product for, by a processor, combined route planning and opportunistic searching, the computer program product comprising a non-transitory computer-readable storage medium having computer-readable program code portions stored therein, the computer-readable program code portions comprising:
an executable portion that receives input of one or more parameters and user preferences;
an executable portion that generates one or more traversal routes from a route network for a user to traverse according to one or more parameters and user preferences;
an executable portion that assigns one or more edge metrics to the one or more traversal routes while periodically updating the one or more parameters, the user preferences, or a combination thereof associated with the one or more traversal routes, wherein the assigned edge metrics are used to recursively compute sub-combinations of sub-paths for each of the one or more traversal routes based on the one or more parameters and the user preferences; and
an executable portion that, responsive to recursively computing each sub-path combination, generates and displays a weighted list of the sub-paths merged together into the one or more traversal routes on a user device display.

16. The computer program product of claim 15, further including an executable portion that:
   defines the one or more parameters to include a distance parameter that is a distance the user intends to traverse or a distance required to traverse on the one or more traversal routes, an elevation parameter as one or more elevations the user intends to ascend or descend for traversing the one or more traversal routes, a popularity parameter as a number of alternative users using the one or more traversal routes equal to or greater than a threshold, wherein the one or more parameters are static, dynamic parameters, or a combination thereof.

17. The computer program product of claim 15, further including an executable portion that:
   determines one or more waypoints and a minimum cost path between each of the one or more waypoints in the route network according to the one or more parameters and user preferences; or
   determines a starting location, a finishing location, and the one or more waypoints in the route network according to the one or more parameters and the user preferences, wherein the starting location and the finishing location are defined as two separate locations or defined as the same location.

18. The computer program product of claim 15, further including an executable portion that:
   determines a first minimum cost path between a selected waypoint and a starting location according to the one or more parameters and user preferences;
   determines a second minimum cost path between the selected waypoint and a finishing location according to the one or more parameters and user preferences; and
   generates a traversal route by joining the first minimum cost path and the second minimum cost path.

19. The computer program product of claim 15, further including an executable portion that:
   generates one or more sub traversal routes between one or more waypoints according to the one or more parameters and user preferences; and
   creates the one or more traversal routes by combining each of the one or more sub traversal routes.

20. The computer program product of claim 15, further including an executable portion that ranks the one or more traversal routes having one or more way points according a level of similarity to the one or more parameters and user preferences.

* * * * *